Dec. 6, 1955  F. K. H. NALLINGER  2,725,954
LUBRICATING DEVICE FOR COMBUSTION ENGINES
Filed Nov. 14, 1950

INVENTOR
FRIEDRICH K.H. NALLINGER
BY:
Haseltine, Lake & Co
AGENTS

United States Patent Office 2,725,954
Patented Dec. 6, 1955

2,725,954
LUBRICATING DEVICE FOR COMBUSTION ENGINES

Friedrich K. H. Nallinger, Stuttgart, Germany, assignor to Daimler-Benz Aktiengesellschaft, Stuttgart-Unterturkheim, Germany Application November 14, 1950, Serial No. 195,550
In Germany October 31, 1949

Public Law 619, August 23, 1954
Patent expires October 31, 1969

5 Claims. (Cl. 184—6)

The invention refers to a lubricating device for combustion engines. The main object of the invention is a reduction of the wear and tear arising at the cylinder running ways.

It is well known that the wear and tear of the cylinder of a combustion engine is for the main part due to the fact that upon starting a still cold engine too small amounts of lubricants reach the cylinder running ways. On one hand, the dry or half-dry running surfaces are as a consequence of the friction subject to a particularly heavy wear and tear, and on the other hand the corrosion influence of the liquid fuel, which reaches the running surfaces, is particularly high, since the latter are not yet protected by an oil film.

A special object of the invention is an elimination of these disadvantages which occur during the cold starting of the engine. Accordingly it is an essential characteristic of the invention that when the engine is cold or the lubricant viscous, the cylinder running ways or respectively other places which need lubricating are supplied with lubricant by by-passing of the normal way of the lubricant. According to a further characteristic of the invention the changing over to this starting lubrication is performed automatically in dependence upon the condition of the lubricant, for example in dependence upon the pressure existing in the lubrication conduit system or upon the viscosity of the lubricant or also, for example by controlled valves, in dependence upon the temperature of the lubricant or of the engine.

In the drawing several examples of construction of the invention are illustrated diagrammatically.

Figure 1:
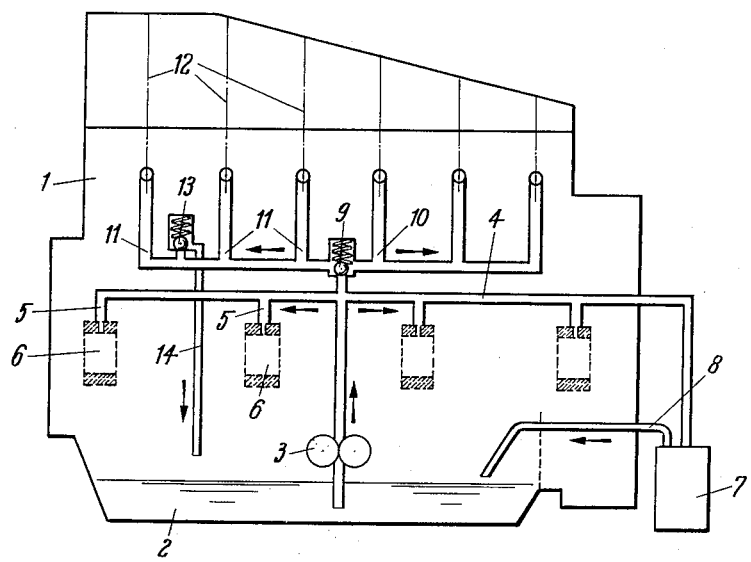
Figure 1 shows the lubricating system of a, for example, 6-cylinder combustion engine, for example for drive of a motor vehicle, with a conduit system for the starting lubrication, which is connected with the excess pressure valve of the normal lubrication conduit system.

In Figure 1 the lubricating oil for the lubrication of a combustion engine 1 is guided from the oil sump 2 through a pump 3 into the conduit 4. From here the lubricating oil flows normally through branch conduits 5 to the bearings 6 for the crankshaft, whence the oil flows in the known manner on the surface of the crankshaft, or is conveyed to the connecting rod bearings through borings in the crankshaft. The oil, which flows from the bearings, returns to the oil sump 2, inasmuch as it is not thrown against the cylinder running ways. At 7 furthermore an oil filter is indicated, to which a part of the lubricating oil can flow from the conduit 4 through a branch conduit and from which it comes after cleaning back through a conduit 8 into the oil sump 2. Furthermore a spring-loaded valve 9 is connected with the conduit 4, which valve opens at a certain high pressure in the conduit 4. The lubricating oil passing through the valve 9 is, however, in contrast to the arrangements known hitherto not guided immediately back to the oil sump 2, but to a conduit 10, from which the oil flows back through suitable borings 11, branch conduits or the like, to the cylinder running ways of the engine cylinders indicated by the cylinder axes 12. If occasion arises, a second excess pressure valve 13 can be connected with the conduit 10, through which the oil can flow off into the oil sump 2 through a return conduit 14. The spring load of the valve 13 is hereby suitably a little higher than that of the valve 9. This second excess pressure valve 13 can, however, also be omitted so that the entire lubricating system is simply provided with only one excess pressure valve, i. e. the valve 9.

The manner of action of the described device is the following:

If the lubricant is, for example at the starting of the engine, still cold and viscous, such a high resistance arises at the exit borings 5 of the bearings 6, that the excess pressure valve 9 opens and the lubricating oil flows off into the conduits 10, 11, which serve as starting lubricating system. The prerequisite herefor is that the line resistance in the starting lubricating system 10, 11 is smaller than in the normal lubricating system 4, 5. This can be achieved by keeping the conduits 10, 11 particularly wide for example in that the exit of the lubricating oil at the cylinder running way offers practically no resistance. For this purpose provision can be made for grooves or other cavities in the cylinder running ways, or in the pistons, or the borings 11 can terminate at such places of the cylinder running ways, which are released by the piston during a part of the time, so that the lubricating oil can flow alternatingly in the one or the other cylinder with relatively small counterpressure.

If, however, occasion arises, the borings 11 can also end at such places of the cylinder running way, which are permanently covered by the piston. If there is provided a second excess pressure valve 13 this will prevent an unacceptably high excess pressure in the lubricating system.

The invention guarantees that the cylinder running ways are lubricated immediately after starting, or receive an additional lubrication, whereby the latter is the more effective the higher the number of revolutions, which the engine attains in cold condition. The starting or additional lubrication ends automatically, when the oil has warmed up and the excess pressure valve closes as a result of the falling counterpressure. Then the normal condition enters, whereby for example the cylinder running ways receive lubricating oil by splashing effect from the crankshaft.

Figure 2:
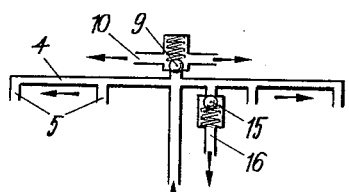
Figure 2 shows a similar example with a second excess pressure valve in the normal conduit system.
Figure 3:
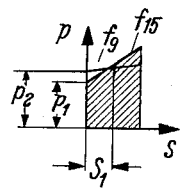
Figure 3 shows a spring diagram for the excess pressure valves in accordance with Figure 2.

In the example of construction in accordance with Figure 2 a further valve 15, which serves as a main excess pressure valve, is connected with the conduit 4 of the normal lubricating system besides the excess pressure valve 9 leading to the starting lubrication conduit 10, through which valve 15 the oil can flow immediately back into the oil sump through a conduit 16. In Figure 3 the spring characteristics $f_{15}$ for the springs of the back pressure valve 15 and $f_9$ for the springs of the back pressure valve 9 are illustrated as an example, whereby the spring pressures $p$ are traced above the spring ways $s$. The valve 15 opens at a pressure $p_1$, which lies below the opening pressure $p_2$ of the valve 9. The characteristic of the spring 15 is selected in such a manner that already after a small stroke $s_1$ the spring tension of the valve 15 exceeds that of the valve 9, which has as a consequence that the valve 9 opens entirely and the still viscous lubricating oil flows off through the valve 9 instead of through the valve 15, and thereby reaches the cylinder running ways. In contrast to this, at normal running, at warm engine and thin liquid oil, the oil will flow through the conduit 4 to the crankshaft bearings without opening the valve 9. Inasmuch as during part of the time a higher counterpressure arises, which exceeds the opening pressure $p_1$ of the valve 15, a small opening of same within the stroke $s_1$ will suffice to compensate the excess pressure in the lubricating system.

Figure 4:
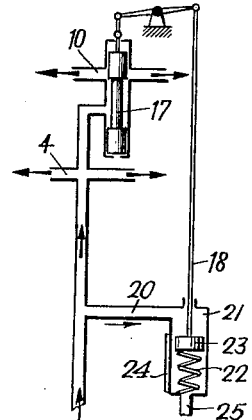
Figure 4 shows a guided control of the starting lubrication system in dependence upon the viscosity of the lubricating oil.

In the example of construction in accordance with Figure 4 the viscosity of the lubricating oil is utilized for shifting of the strut system 18 to actuate a slide valve 17. The lubricating oil conveyed by the pump 3 enters for this purpose a cylinder space 21 through a conduit 20, in which cylinder space a piston 23, which is loaded by the spring 22, moves for the shifting of the strut system 18. A throttle groove 24 in the wall of the cylinder 21 is for example slightly conic and is controlled by the conduit 20, by a return conduit 25, which leads to the oil sump. With a viscous oil, the throttle groove 24 will give high resistance to the traversing oil, which has as a consequence that the piston 23 is moved downward against the effect of the spring 22 and thereby opens the valve 17. Simultaneously the throttling at the throttle groove 24 is thereby diminished. In accordance with the viscosity of the oil, the valve 17 will consequently open more or less, viz. the more, the more viscous the oil still is.

For the rest the manner of action of the example of construction in accordance with Figure 4 is principally the same as in the examples of construction in accordance with Figures 1 and 2.

The invention is not restricted to the illustrative examples of construction, but can be varied at discretion within the bounds of the individual ideas of the invention.

What I claim is:

1. A cold starting lubricating device for combustion engines, comprising a pump, a main lubrication conduit system supplied by the pump under pressure and leading to the crankshaft bearings of the engine, an auxiliary lubrication system branching off from the main system and leading to the cylinder running ways of the engine, a first excess pressure valve normally separating the said auxiliary system from the main system and opening substantially only in the cold starting condition of the engine, a second excess pressure valve and a return conduit controlled by the second valve, wherein the second valve is so constructed and arranged that it at least partly opens at a higher pressure in the conduit system than that at which the first valve opens.

2. A cold starting lubricating device for combustion engines, comprising a pump, a main lubrication conduit system supplied by the pump under pressure and leading to the crankshaft bearings of the engine, an auxiliary lubrication system branching off from the main system and leading to the cylinder running ways of the engine, a first excess pressure valve normally separating the said auxiliary system from the main system and opening substantially only in the cold starting condition of the engine, a second excess pressure valve in the auxiliary system and a return conduit controlled by the second valve, wherein the second valve is so constructed and arranged that it opens at a higher pressure in the conduit system than that at which the first valve opens.

3. A cold starting lubricating device for combustion engines, comprising a pump, a main lubrication conduit system supplied by the pump under pressure and leading to the crankshaft bearings of the engine, an auxiliary lubrication system branching off from the main system and leading to the cylinder running ways of the engine, a first excess pressure valve normally separating the said auxiliary system from the main system and opening substantially only in the cold starting condition of the engine, a second excess pressure valve in the main system and a return conduit controlled by the second valve, wherein the second valve is so constructed and arranged that it first opens to a predetermined stroke at a smaller pressure than that at which the first valve opens and hereafter opens to a further extent only if the first valve is open.

4. In a cold starting lubricating device for combustion engines including a pump device, a main lubrication conduit system supplied by the pump device under pressure and leading to parts of the engine to be lubricated, and an auxiliary lubrication conduit system branching off from the main system and leading to the cylinder running ways of the engine, a control device normally separating the auxiliary system from the main system and opening substantially only in the cold starting condition of the engine, said control device comprising a spring-loaded piston, a conduit branching off from the main system to that side of the piston the pressure load of which acts against the spring load, a return conduit for the lubricant, throttling means controlled by the piston to open an amount directly proportional to the pressure of the lubricant between said branching off conduit and said return conduit, a member controlling the connection between the main and auxiliary systems, and means for adjusting said member by movement of the piston whereby movement of the piston under increasing pressure of the lubricant operates said member to open the connection between the main and auxiliary systems.

5. In a lubricating device for combustion engines including a pump, a main lubricating conduit system for supplying oil from the pump to the engine crank-shaft bearings, and an auxiliary lubricating conduit system for supplying oil from the main system to the engine cylinders, the provision of first valve means establishing a communication between the two systems when the oil pressure in the main system, resulting from a temperature conditioned increase of viscosity of the oil, exceeds a predetermined working pressure, and normally interrupting the communication between the two systems at or below said predetermined working pressure, and second valve means independent from said first valve means in one of the two systems for protecting against excessive oil pressure therein constructed and arranged to present a fully open cross-section of flow only at higher pressures than said first valve means.

References Cited in the file of this patent

UNITED STATES PATENTS

| Number | Name | Date |
|---|---|---|
| 1,276,846 | White | Aug. 27, 1918 |
| 1,694,518 | Rushmore | Dec. 11, 1928 |
| 1,809,357 | Sanger | June 9, 1931 |
| 1,892,443 | Winslow | Dec. 27, 1932 |
| 1,992,339 | Winslow | Feb. 26, 1935 |
| 2,406,239 | Morgenroth | Aug. 20, 1946 |